(12) United States Patent
Qi et al.

(10) Patent No.: US 11,057,759 B2
(45) Date of Patent: Jul. 6, 2021

(54) MOBILE SIGNALING MANAGEMENT METHOD

(71) Applicants: INSTITUTE OF ACOUSTICS, CHINESE ACADEMY OF SCIENCES, Beijing (CN); BEIJING HILI TECHNOLOGY CO. LTD, Beijing (CN)

(72) Inventors: Weining Qi, Beijing (CN); Jun Chen, Beijing (CN); Lingfang Wang, Beijing (CN)

(73) Assignees: INSTITUTE OF ACOUSTICS, CHINESE ACADEMY OF SCIENCES, Beijing (CN); BEIJING HILI TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 16/760,008

(22) PCT Filed: Dec. 17, 2018

(86) PCT No.: PCT/CN2018/121490
§ 371 (c)(1),
(2) Date: Apr. 28, 2020

(87) PCT Pub. No.: WO2019/120164
PCT Pub. Date: Jun. 27, 2019

(65) Prior Publication Data
US 2020/0351634 A1    Nov. 5, 2020

(30) Foreign Application Priority Data
Dec. 19, 2017 (CN) .......................... 201711378517.4
Dec. 29, 2017 (CN) .......................... 201711484931.3

(51) Int. Cl.
*H04W 8/06* (2009.01)
*H04W 8/26* (2009.01)
*H04W 64/00* (2009.01)

(52) U.S. Cl.
CPC ............... *H04W 8/06* (2013.01); *H04W 8/26* (2013.01); *H04W 64/00* (2013.01)

(58) Field of Classification Search
CPC .......... H04W 8/06; H04W 8/26; H04W 8/02; H04W 64/00; H04W 48/00
See application file for complete search history.

(56) References Cited

U.S. PATENT DOCUMENTS

| | | | |
|---|---|---|---|
| 7,313,631 B1 * | 12/2007 | Sesmun | H04L 29/12066 370/310 |
| 2006/0002344 A1 * | 1/2006 | Ono | H04W 36/38 370/331 |

(Continued)

FOREIGN PATENT DOCUMENTS

| CN | 101018412 A | * | 8/2007 |
|---|---|---|---|
| CN | 101018412 A | | 8/2007 |

(Continued)

OTHER PUBLICATIONS

Feb. 11, 2019 International Search Report issued in International Patent Application No. PCT/CN2018/121490.

*Primary Examiner* — Farid Seyedvosoghi
(74) *Attorney, Agent, or Firm* — Oliff PLC

(57) ABSTRACT

A mobile signaling management method uses a distributed container with a hierarchical nested structure to process the registration and query of location information of user equipment, including: first user equipment connected to a first network device, to obtain a first network address allocated by the first network device; the first user equipment registering to a first mobility management node binding information between the name of the first user equipment and the (Continued)

first network address, the first mobility management node being a node where the first user equipment is located after movement; the first user equipment updating to a second network device the binding information between the name of the first user equipment and the first network address; and the first user equipment updating to second user equipment at the communication peer end the binding information between the name of the first user equipment and the first network address.

14 Claims, 1 Drawing Sheet

(56) References Cited

U.S. PATENT DOCUMENTS

| | | | | |
|---|---|---|---|---|
| 2008/0256220 A1* | 10/2008 | Bachmann | ............... | H04W 8/04 709/222 |
| 2010/0281148 A1* | 11/2010 | Turanyi | ................ | H04W 8/04 709/222 |
| 2010/0296443 A1* | 11/2010 | Hirano | ................ | H04W 8/082 370/328 |
| 2011/0026435 A1* | 2/2011 | Weniger | ............... | H04L 63/029 370/254 |

FOREIGN PATENT DOCUMENTS

| | | |
|---|---|---|
| CN | 101895458 A | 11/2010 |
| EP | 1 953 992 A1 | 8/2008 |

\* cited by examiner

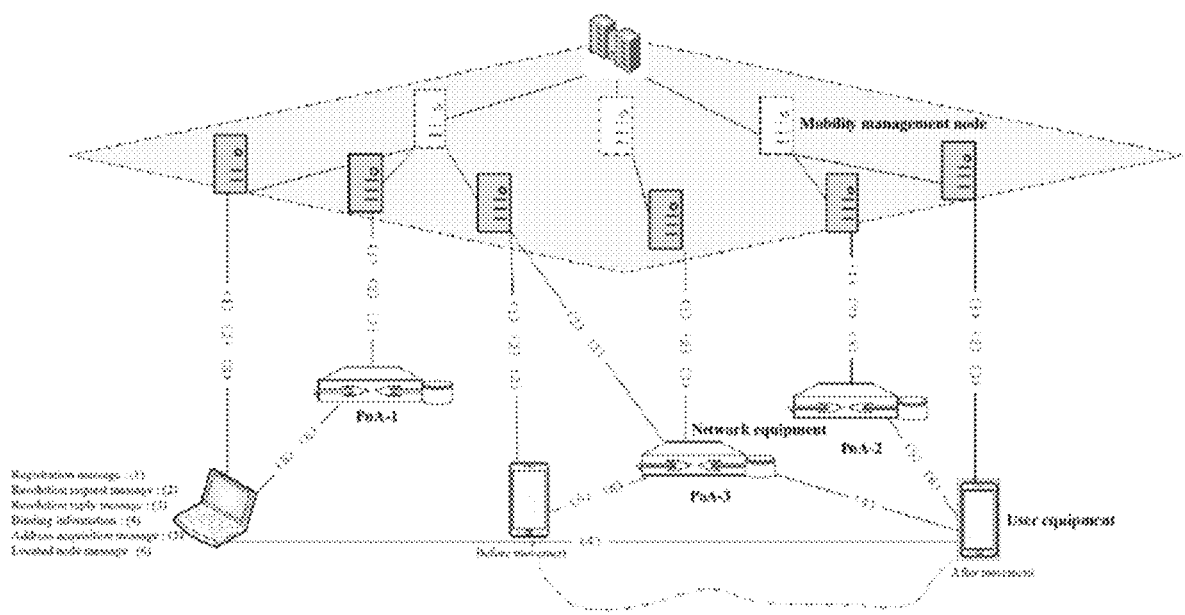

MOBILE SIGNALING MANAGEMENT METHOD

RELATED APPLICATION

This application claims priority to Chinese patent application No. 201711378517.4, filed with Chinese Patent Office on Dec. 19, 2017, and Chinese patent application No. 201711484931.3 filed with Chinese Patent Office on Dec. 19, 2017 and entitled "Mobile Signaling Management Method", which are incorporated herein by reference in its entirety.

FIELD OF THE INVENTION

The present application relates to the field of communications, in particular to a mobile signaling management method.

BACKGROUND OF THE INVENTION

Mobility management technology involves management of user equipment location information, security, and service continuity, and is intended to achieve an optimal connection state between a terminal and a network, thereby providing guarantee for the application of various network services.

High-speed movement of the terminal may cause rapid changes of the IP addresses of an existing Internet system. Information-centric networking (ICN) has a core concept that the name is separated from the address, and adopts a naming mechanism of ICN, in which each entity in the network obtains a location-independent unique identifier of the entity as its name, and by dynamically binding the name of the entity and the current network address of the entity, the problem of rapid IP address changes during communication may be solved. How to perform signaling interactions between user equipment, an access network, and mobility management services is an indispensable link in data communication, and its performance directly affects the quality of network services.

Mobility management methods in ICN include local data acquisition and path repair methods, and agent-based global mobility management methods. A local repair method can quickly accomplish the transmission of a data packet from a location before movement to a location after movement. However, the local repair method is prone to cause a path stretching and triangular routing. An agent-based global mobility management method can avoid the above-mentioned path stretching problem. However, the presence of mobile agents causes a load imbalance, and is also not conducive to rapid local repair and may cause data interruption in real-time communication services.

SUMMARY OF THE INVENTION

A technical problem to be solved by the embodiments of the present invention is: after user equipment (UE) at a mobile node in a communication session changes its current network address due to its movement, how to enable, through signaling interactions, network equipment responsible for transmitting and forwarding its communication data and user equipment at a correspondent node to quickly find the current new address after its movement. New location information is obtained by a query at the mobile node locally or at both the mobile node and the correspondent node to ensure communication messages can be forwarded to the new location in time so as to ensure the persistence of service sessions and avoid path stretching as soon as possible.

To solve the aforementioned problem, an embodiment of the present invention provides a mobile signaling management method, which uses a hierarchical nested structure of distributed containers to process the registration and query of location information of user equipment, the method including: connecting first user equipment to first network equipment, to obtain a first network address allocated by the first network equipment; registering, by the first user equipment, binding information between the first user equipment's name and first network address with a first mobility management node, the first mobility management node being a node where the first user equipment is located after movement; updating, by the first user equipment, the binding information between the first user equipment's name and first network address to second network equipment; and updating, by the first user equipment, the binding information between the first user equipment's name and first network address to second user equipment at a correspondent node.

The method further includes: if first network address information is unreachable externally, acquiring, by the first user equipment, the first network address from the first network equipment through an address acquisition message; updating, by the first user equipment, the binding information between the first user equipment's name and first network address to the second user equipment at the correspondent node; and transmitting, by the second network equipment, a resolution request information to the second mobility management node, so that the second network equipment updates the binding information between the first user equipment's name and first network address, the second mobility management node being a node where the first user equipment moves is located before movement.

Based on the method provided in the embodiment of the present invention, the binding information at least includes the first user equipment's name, first network address information, and/or serial number.

Based on the method provided in the embodiment of the present invention, the first user equipment's name is unique, durable, and usable.

Based on the method provided in the embodiment of the present invention, the network equipment is configured to allocate a network address to the user equipment; location registration information of the user equipment includes: the user equipment's name, valid location information, and serial number, wherein the serial number is maintained by the user equipment and updated with each registration; the user equipment and the network equipment register binding information between the name and address with the mobility management node; the user equipment and the network equipment belong to the same mobility management node, or the user equipment and the network equipment do not belong to the same mobility management node.

Based on the method provided in the embodiment of the present invention, if first network address information is unreachable externally, updating, by the first user equipment, the binding information between the first user equipment's name and first network address to the second user equipment at the correspondent node includes: detecting, by the first user equipment, that first network address information is unreachable externally, and transmitting, by the first user equipment, the address acquisition message to the first network equipment to obtain the first network address information, wherein the network address of the first network equipment is an external network address; transmitting and updating, by the first user equipment, the binding information between the first user equipment's name and first network address to the second network equipment; transmitting, by the first user equipment, the binding information between the first user equipment's name and first network address to the second user equipment; and receiving, by the second user equipment, the binding information between the first user equipment's name and first network address, checking the legitimacy of the message, and updating the binding information between the first user equipment's name and first network address.

Based on the method provided in the embodiment of the present invention, the first user equipment reports the network address information of the first user equipment at the mobility management node to the first network equipment.

Based on the method provided in the embodiment of the present invention, signaling message interactions are performed in a self-verifying manner.

The mobile signaling management method provided in the embodiment of the present invention is directed to the requirement of communication session persistence to solve the problem that after the network address of an entity at a mobile node changes due to its movement, network forwarding and storage devices and a correspondent node cannot quickly reacquire network location information of the mobile node, thus meeting the service requirements of restoring communication, keeping sessions persistent, and improving the path stretching as soon as possible.

BRIEF DESCRIPTION OF THE DRAWINGS

FIG. 1 is a schematic diagram of a mobile signaling management method according to an embodiment of the present invention.

DETAILED DESCRIPTION OF THE EMBODIMENTS

Technical solutions of the present invention are further described in detail below in conjunction with the accompanying drawings and embodiments.

FIG. 1 is a schematic diagram of a mobile signaling management method according to an embodiment of the present invention. As shown in FIG. 1, the method uses a hierarchical nested structure of distributed containers to process the registration and query of location information of user equipment, and a mobile communication network adopts information-centric networking to support mobile signaling, and network element devices that perform signaling interactions include user equipment, network equipment, and mobility management nodes. To support the mobility, there are 6 types of signaling messages to interact: registration messages, resolution request messages, resolution reply messages, binding messages, address acquisition messages, and located node messages. The binding information at least includes user equipment's name, first network address information, and/or serial number. The user equipment's name is unique, durable, and usable.

Signaling messages interacted between user equipment and mobility management nodes include registration messages, resolution request messages, and resolution reply messages; signaling messages interacted between user equipment and network equipment include: address acquisition messages, located node messages, and binding message; signaling messages interacted between network equipment and mobility management nodes include registration messages, resolution request messages, and resolution reply messages; and signaling messages interacted between user equipment and user equipment include: binding messages. The network equipment is configured to allocate a network address to the user equipment; location registration information of the user equipment includes: the user equipment's name, valid location information, and serial number, wherein the serial number is maintained by the user equipment and updated with each registration; the user equipment and the network equipment register binding information between the name and address with the mobility management node; the user equipment and the network equipment may belong to the same mobility management node, or the user equipment and the network equipment may not belong to the same mobility management node.

The user equipment may acquire address information of the mobility management node to which the user equipment belongs through configuration information or in other method.

In the process of communication session persistence, signaling message interactions are performed after the network address of the user equipment changes due to movement of the user equipment. To ensure the security and reliability of the messages, all signaling message interactions are performed in a self-verifying manner.

After the user equipment obtains the network address from the network equipment, it detects whether it is an internal network address.

If the network address obtained by the user equipment is not an internal network address, the user equipment transmits a registration message to the node to which it belongs, and the registration message at least includes the user equipment's name, the newest network address information and/or serial number of the user equipment. The user equipment's name is unique, durable, and usable.

The user equipment transmits a binding message to the network equipment connected therewith before its movement, and updates the binding information between its name and network address, wherein the binding information at least includes the user equipment's name, the newest network address information and serial number of the user equipment.

The user equipment transmits the binding message to the network equipment in data connection therewith currently at a correspondent node, and updates the binding information between its name and network address, wherein the binding information at least includes the user equipment's name, the newest network address information and/or serial number of the user equipment.

If the network address obtained by the user equipment is an internal network address, the user equipment transmits address acquisition information to the current network equipment to obtain the network address (external network address) of the network equipment.

The user equipment transmits a registration message to the node to which it belongs, wherein the registration message at least includes the user equipment's name, the newest network address information and/or serial number of the user equipment.

The user equipment transmits a binding message to the network equipment connected therewith before its movement, and updates the binding information between its name and network address, wherein the binding information at least includes the user equipment's name, the user equipment's network point of attachment and/or serial number.

The user equipment transmits the binding message to the network entity in data connection therewith currently at a correspondent node, and updates the binding information between its name and network address, wherein the binding information at least includes the user equipment's name, the newest network address information and/or serial number of the user equipment.

The user equipment transmits a located node message to the network equipment connected therewith currently, and reports the network address of the node where it is located to the network equipment connected therewith currently.

After the network equipment connected with the user equipment before movement of the user equipment receives a data packet transmitted to the user equipment and detects that the user equipment has been disconnected therefrom, the network equipment queries the node address to which the user equipment belongs and transmits a resolution request message to the mobility management node. The resolution request message at least includes the user equipment's name.

After receiving the resolution request message, the mobility management node queries the registration message and transmits a resolution reply message to the network equipment transmitting the resolution request, wherein the resolution reply message at least includes the user equipment's name, network address, and/or serial number.

The user equipment at a correspondent node in data connection with the user equipment may also periodically transmits a resolution request message to the node to which it belongs to obtain the latest binding information of the user equipment.

In actual implementation, the foregoing method for signaling interactions is also extended to include the following: If some user equipment does not support binding signaling transmission, the network equipment to which the user equipment belongs is responsible for transmitting a binding information message in place of the user equipment.

The mobile signaling management method provided in the embodiment of the present invention is directed to the requirement of communication session persistence to solve the problem that after the network address of an entity at a mobile node changes due to its movement, network forwarding and storage devices and a correspondent node cannot quickly reacquire network location information of the mobile node, thus meeting the service requirements of restoring communication, keeping sessions persistent, and improving the path stretch as soon as possible.

The foregoing specific embodiments further describe the objectives, technical solutions and beneficial effects of the present invention in detail. It should be understood that described above are only specific embodiments of the present invention, which are not intended to limit the protection scope of the present invention, and all modifications, equivalent substitutions, and improvements made within the spirit and principle of the present invention shall be encompassed within the protection scope of the present invention.

The invention claimed is:

1. A mobile signaling management method, which uses a hierarchical nested structure of distributed containers to process the registration and query of location information of user equipment, the method comprising
   connecting first user equipment to first network equipment, to obtain a first network address allocated by the first network equipment;
   registering, by the first user equipment, binding information between the first user equipment's name and first network address with a first mobility management node, the first mobility management node being a node where the first user equipment is located after movement;
   updating, by the first user equipment, the binding information between the first user equipment's name and first network address to second network equipment; and
   updating, by the first user equipment, the binding information between the first user equipment's name and first network address to second user equipment at a correspondent node.

2. The method according to claim 1, further comprising:
   when first network address information is unreachable externally, acquiring, by the first user equipment, the first network address from the first network equipment through an address acquisition message;
   updating, by the first user equipment, the binding information between the first user equipment's name and first network address to the second user equipment at the correspondent node; and
   transmitting, by the second network equipment, a resolution request information to the second mobility management node, so that the second network equipment updates the binding information between the first user equipment's name and first network address, the second mobility management node being a node where the first user equipment moves is located before movement.

3. The method according to claim 2, wherein the binding information at least comprises the first user equipment's name, first network address information, and/or serial number.

4. The method according to claim 2, wherein the first user equipment's name is unique, durable, and usable.

5. The method according to claim 2, wherein the network equipment is configured to allocate a network address to the user equipment; location registration information of the user equipment comprises: the user equipment's name, valid location information, and serial number, wherein the serial number is maintained by the user equipment and updated with each registration; the user equipment and the network equipment register the binding information between the name and the address with the mobility management node; the user equipment and the network equipment belong to the same mobility management node, or the user equipment and the network equipment do not belong to the same mobility management node.

6. The method according to claim 2, wherein when first network address information is unreachable externally, updating, by the first user equipment, the binding information between the first user equipment's name and first network address to the second user equipment at the correspondent node comprises:
   detecting, by the first user equipment, that first network address information is unreachable externally, and transmitting, by the first user equipment, the address acquisition message to the first network equipment to obtain the first network address information, wherein the network address of the first network equipment is an external network address;
   transmitting and updating, by the first user equipment, the binding information between the first user equipment's name and first network address to the second network equipment;
   transmitting, by the first user equipment, the binding information between the first user equipment's name and first network address to the second user equipment; and receiving, by the second user equipment, the binding information between the first user equipment's name and first network address, checking the legitimacy of the message, and updating the binding information between the first user equipment's name and first network address.

7. The method according to claim 2, wherein the first user equipment reports the network address information of the first user equipment at the mobility management node to the first network equipment.

8. The method according to claim 2, wherein signaling message interactions are performed in a self-verifying manner.

9. The method according to claim 1, wherein the binding information at least comprises the first user equipment's name, first network address information, and/or serial number.

10. The method according to claim 1, wherein the first user equipment's name is unique, durable, and usable.

11. The method according to claim 1, wherein the network equipment is configured to allocate a network address to the user equipment; location registration information of the user equipment comprises: the user equipment's name, valid location information, and serial number, wherein the serial number is maintained by the user equipment and updated with each registration; the user equipment and the network equipment register the binding information between the name and the address with the mobility management node; the user equipment and the network equipment belong to the same mobility management node, or the user equipment and the network equipment do not belong to the same mobility management node.

12. The method according to claim 1, wherein when first network address information is unreachable externally, updating, by the first user equipment, the binding information between the first user equipment's name and first network address to the second user equipment at the correspondent node comprises:

detecting, by the first user equipment, that first network address information is unreachable externally, and transmitting, by the first user equipment, the address acquisition message to the first network equipment to obtain the first network address information, wherein the network address of the first network equipment is an external network address;

transmitting and updating, by the first user equipment, the binding information between the first user equipment's name and first network address to the second network equipment;

transmitting, by the first user equipment, the binding information between the first user equipment's name and first network address to the second user equipment; and receiving, by the second user equipment, the binding information between the first user equipment's name and first network address, checking the legitimacy of the message, and updating the binding information between the first user equipment's name and first network address.

13. The method according to claim 1, wherein the first user equipment reports the network address information of the first user equipment at the mobility management node to the first network equipment.

14. The method according to claim 1, wherein signaling message interactions are performed in a self-verifying manner.

* * * * *